(12) United States Patent  (10) Patent No.: US 8,170,240 B2
Suzuki                         (45) Date of Patent:    May 1, 2012

(54) AUDIO DEVICE

(75) Inventor: Takashi Suzuki, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 257 days.

(21) Appl. No.: 12/731,996

(22) Filed: Mar. 25, 2010

(65) Prior Publication Data

US 2010/0246856 A1    Sep. 30, 2010

(30) Foreign Application Priority Data

Mar. 26, 2009  (JP) ................ 2009-076879

(51) Int. Cl.
*H04B 1/00* (2006.01)
*G06F 3/00* (2006.01)
(52) U.S. Cl. ..................... 381/119; 715/716
(58) Field of Classification Search .......... 381/119, 381/118, 120; 715/716, 727, 728, 781; 700/94; 369/1, 4, 5
See application file for complete search history.

(56) References Cited

U.S. PATENT DOCUMENTS

| | | | |
|---|---|---|---|
| 4,635,288 A * | 1/1987 | Stadius .................... | 381/119 |
| 7,206,651 B2 * | 4/2007 | Takemura et al. ............. | 700/94 |
| 7,392,103 B2 * | 6/2008 | Takahashi ................. | 700/94 |
| 8,098,850 B2 * | 1/2012 | Terada et al. ............... | 381/119 |
| 2003/0006280 A1 * | 1/2003 | Seita et al. ................. | 235/380 |
| 2006/0210098 A1 | 9/2006 | Okabayashi et al. | |
| 2007/0053529 A1 * | 3/2007 | Suyama et al. ............. | 381/119 |
| 2007/0061729 A1 * | 3/2007 | Terada .................. | 715/727 |
| 2007/0067055 A1 * | 3/2007 | Terada .................. | 700/94 |
| 2010/0266147 A1 * | 10/2010 | Radford ................. | 381/119 |

FOREIGN PATENT DOCUMENTS

JP    2006-262079    9/2006

* cited by examiner

*Primary Examiner* — Hai Phan
(74) *Attorney, Agent, or Firm* — Morrison & Foerster LLP (57) ABSTRACT

An audio device has controls for setting parameters. In the audio device, a selection mode setting part sets a selection mode in which a parameter to be stored is selected. A position acquisition part acquires positions of the controls and locks setting states of the parameters that are set by the controls, when the selection mode is set by the selection mode setting part. A parameter selection part detects one or more control operated by a user among the controls and selects each parameter corresponding to each operated control among the controls as a parameter to be stored, after the setting states of the parameters are locked by the position acquisition part. A reset part returns positions of the controls to the positions acquired by the position acquisition part and memorizes a selection status of each parameter which indicates whether each parameter is selected or not, when the selection mode is completed.

11 Claims, 6 Drawing Sheets

AUDIO DEVICE

BACKGROUND OF THE INVENTION

1. Technical Field of the Invention

The present invention relates to an audio device that can select and store desired parameters of a scene that has been set.

2. Description of the Related Art

A conventional digital mixer, which is used in a concert hall or the like, adjusts levels, frequency characteristics, or the like of audio signals output from a number of microphones or electric or electronic devices, and mixes the adjusted audio signals and outputs the resulting signals to a power amplifier. An operator or user who operates the digital mixer adjusts the volume, tone, and the like of each audio signal of musical instrument sound or vocal sound to desired states in which a played performance is heard optimally, by operating a variety of panel controls provided on the digital mixer. The digital mixer has buses for mixing signals from input channels and output channels for outputting the mixed signals. The input channels control the frequency characteristics, mixing levels, or the like of input signals and output the resulting signals to mixing buses. The mixing buses then mix the input signals and output the resulting signals to corresponding output channels. Signals output from the output channels are amplified and provided to speakers which then output the amplified sound signals.

Japanese Patent Application Publication No. 2006-262097 is referred to as related art reference.

All parameters indicating the setting states of controls such as faders, knobs, and switches of the conventional digital mixer can be stored as scene data in a scene memory or the like. Each of a plurality of scene data is stored with a respective scene number assigned thereto. By performing a recall operation after specifying a scene number, it is possible to read scene data corresponding to the specified scene number and to recreate setting states of the controls according to the scene data on the digital mixer. Accordingly, it is possible to recreate a variety of scenes such as a conference room, a banquet, a mini theater, and a multipurpose hall once the scenes have been set.

When scene data is stored, the conventional digital mixer allows only specific parameters of the scene data to be selected and stored. When parameters to be stored are selected, a parameter selection window is displayed on a display unit provided on the panel of a digital mixer. A selection list for selecting parameters is displayed on the parameter selection window. Channel numbers are sequentially arranged in a vertical direction of the selection list. Items or parameters to be selected are arranged in a horizontal direction of the selection list.

However, the conventional selection method using the selection list has the following problems. The selection list is very large and it takes a long time to search for items or parameters to be stored since the number of channels is up to 256 or 512 and the number of parameter items is very large. In addition, it is necessary to individually set selection of parameters to be stored for each of a number of channels, and it is thus necessary to spend a lot of time and labor on the selection task.

SUMMARY OF THE INVENTION

Therefore, it is an object of the present invention to provide an audio device that enables an intuitive selection task so that it is easy to perform a task for selecting parameters to be stored.

In order to solve the above problems, an audio device of the present invention has a most important feature that, when a parameter selection mode has been set, positions of controls for setting values of parameters are acquired and setting states of parameters are locked, and a parameter corresponding to a control operated or moved by a user among the controls is selected as a parameter to be stored.

According to the present invention, since parameters to be stored can be selected by operating (or moving) controls for setting the parameters, the user can intuitively select parameters that the user desires to store, and thus the user can easily and efficiently perform a parameter selection task. In addition, erroneous selection does not easily occur since the user performs operations on the controls for selecting parameters to be stored while viewing the controls arranged on a panel or images of controls displayed on a display unit. It is also possible to select fine parameters that are not prepared in the conventional selection list. Further, when a parameter selection mode has been set, setting states of parameters are locked even though controls are operated to perform selection of parameters and therefore current setting states of the parameters are maintained even when the controls have been moved by the user.

DETAILED DESCRIPTION OF THE INVENTION

Figure 1:
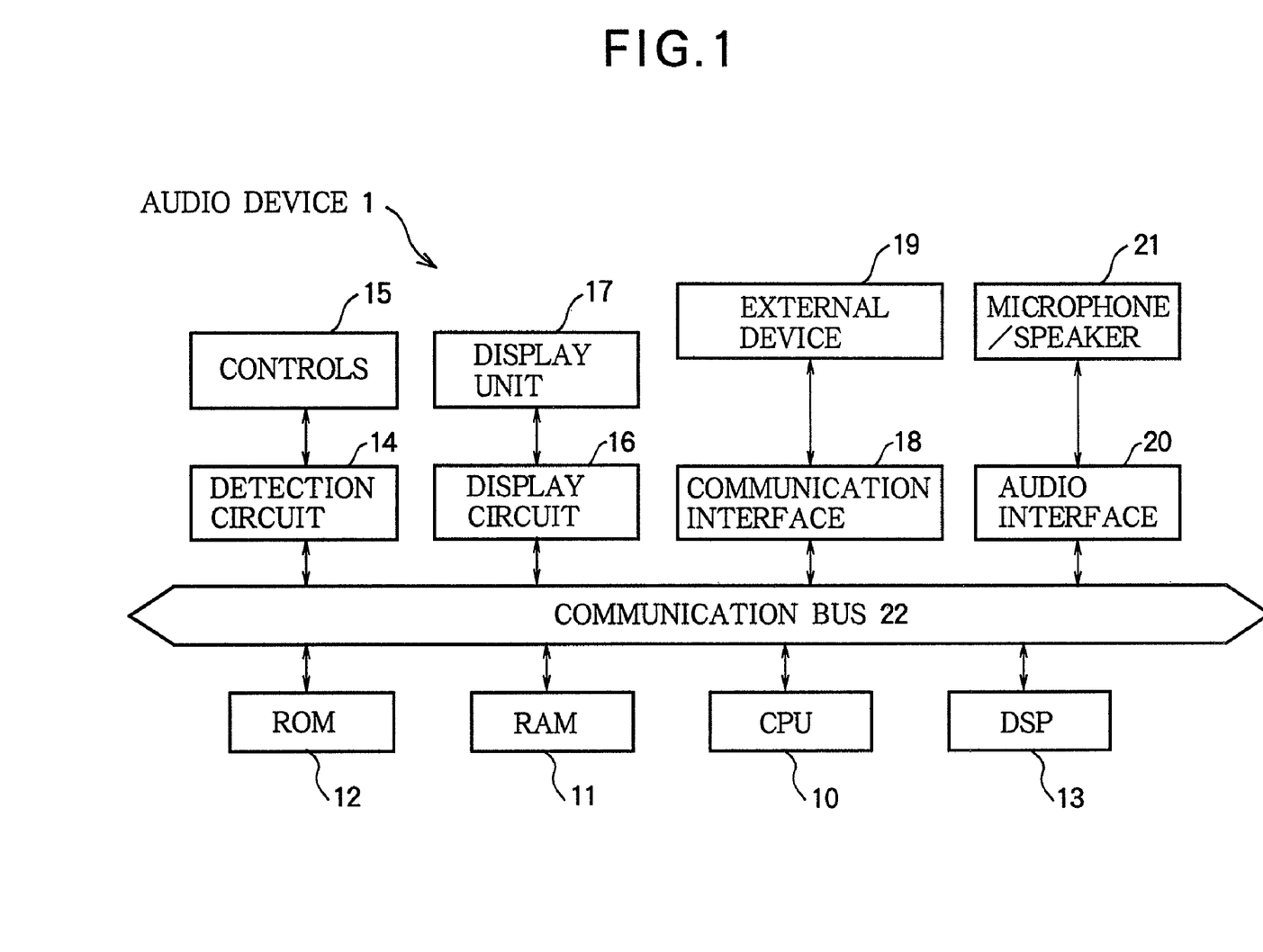
FIG. 1 is a block diagram illustrating a configuration of an audio device according to, an embodiment of the present invention.

FIG. 1 is a block diagram illustrating a configuration of an audio device according to an embodiment of the present invention.

In the audio device 1 shown in FIG. 1, a Central Processing Unit (CPU) 10 executes an Operating System (OS) and controls the overall operation of the audio device 1 through the OS. The audio device 1 includes a Read Only Memory (ROM) 12 which stores an operating program such as a mixing control program that is executed by the CPU 10 and a Random Access Memory (RAM) 11 which stores a variety of data and work area data of the CPU 10. The CPU 10 executes the mixing control program to cause a Digital Signal Processor (DSP) 13 to perform an audio signal process on a plurality of input audio signals to mix the input audio signals. A rewritable ROM such as a flash memory may be used as the ROM 12 to allow rewriting of the operating program and to facilitate version upgrade of the operating program. Under control of the CPU 10, the DSP 13 mixes the input audio signals after adjusting volume levels, frequency characteristics, and the like of the input audio signals based on corresponding parameters and performs a digital signal process on the mixed signals to control audio characteristics thereof such as volume, pan, and effects based on corresponding parameters.

A detection circuit 14 scans controls 15 such as faders, knobs, and switches mounted on a panel of the audio device 1 to detect operations performed on the controls 15. The detection circuit 14 can change values of the parameters that are used for the audio signal process based on detected operation signals. A display circuit 16 causes a display unit 17, which includes a display such as a liquid crystal display, to display a variety of mixing-related windows. A communication interface (I/F) 18 is an interface for connection to an external device 19 to perform communication with the external device 19. The communication interface 18 may be an interface for a network based on, for example, the Ethernet (registered trademark), and the external device 19 may be a control device or the like that controls the audio device 1. An audio interface 20 is a network interface for exchanging audio signals with a microphone/speaker 21 that outputs or receives audio signals. The DSP 13 performs signal processing on an audio signal from the microphone 21 or the like input through the audio interface 20. A processed audio signal such as a mixed audio signal is output through the speaker 21, which is directed toward audience seats, via the audio interface 20. Each of these components exchanges data with each other through communication buses 22.

Figure 2:
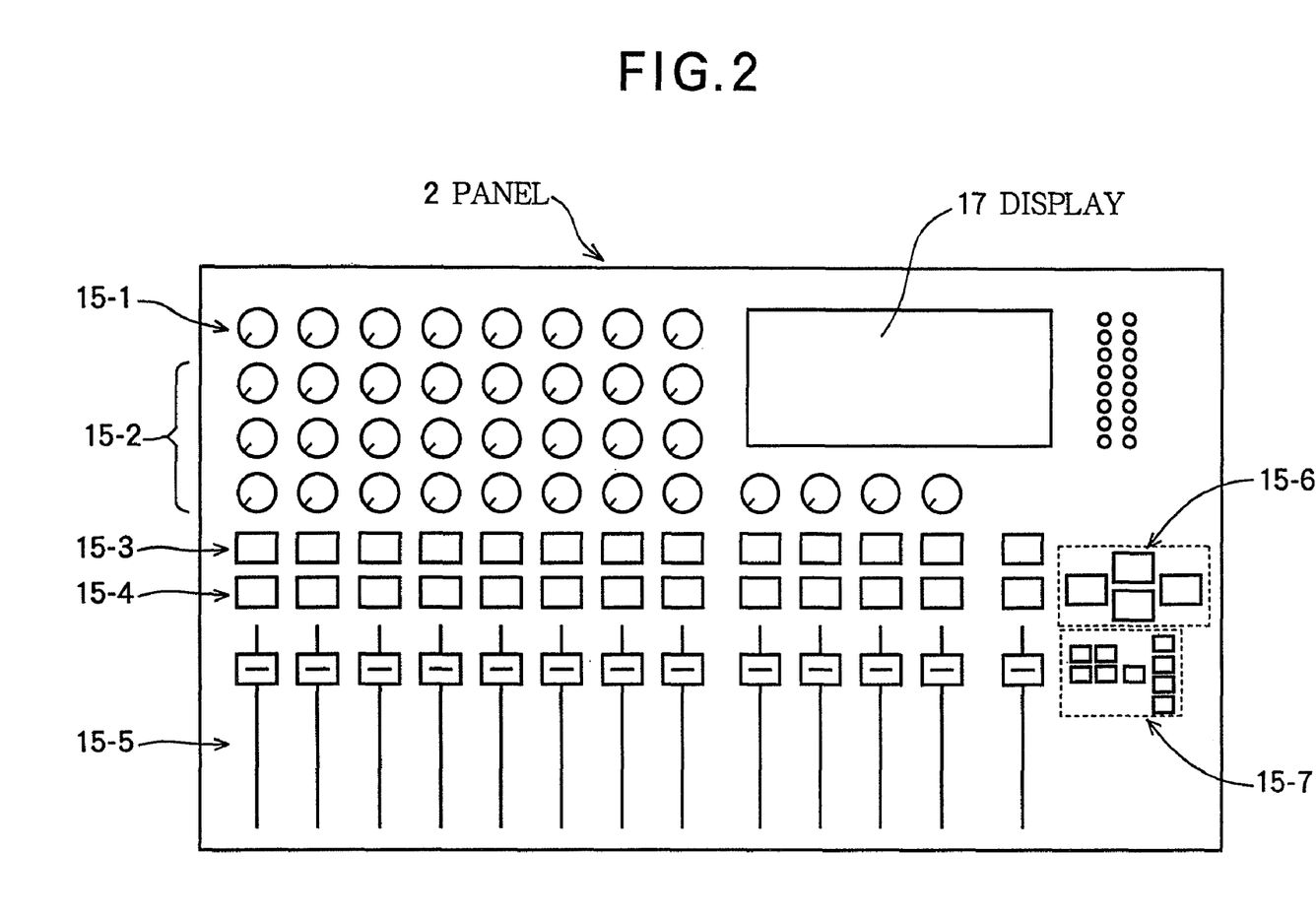
FIG. 2 illustrates an example configuration of a panel included in the audio device according to the present invention.

FIG. 2 illustrates an example configuration of a panel 2 included in the audio device 1.

The panel 2 shown in FIG. 2 includes a display unit 17 which includes a display such as a liquid crystal display. The panel 2 also includes a plurality of channel strips for multiple channels. Each of the channel strips includes an ATT knob 15-1, three EQ knobs 15-2, an ON switch 15-3, an SEL switch 15-4, and a fader 15-5. The ATT knob 15-1 adjusts the level of a head amplifier of a channel allocated to the corresponding channel strip. The three EQ knobs 15-2 set equalizer characteristics of the allocated channel. The ON switch 15-3 switches the allocated channel on or off. The SEL switch 15-4 selects the channel allocated to the channel strip. The fader 15-5 includes a handle (or slider) for controlling the level of the allocated channel. The panel 2 also includes a scene memory key set 15-6 and a layer key set 15-7. The scene memory key set 15-6 is used to perform an operation for storing or reading scene data in or from a scene memory. The layer key set 15-7 is used to perform an operation for selecting a layer that is operated by the channel strip.

Figure 3:
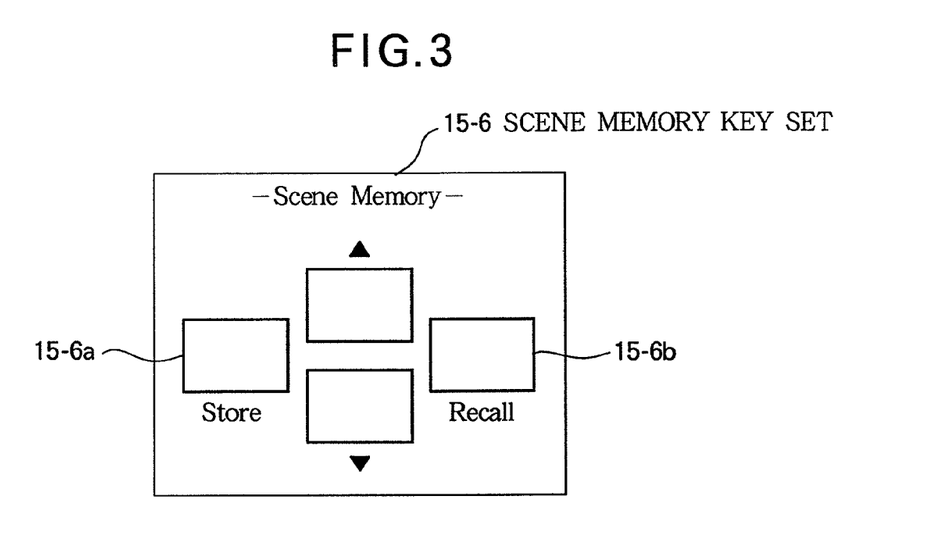
FIG. 3 is an enlarged view of a scene memory key provided on the panel of the audio device according to the present invention.

FIG. 3 is an enlarged view of the scene memory key set 15-6. The scene memory key set 15-6 includes a store key 15-6a, a recall key 15-6b, and two selection keys. The store key 15-6a is provided on the scene memory key set 15-6 at a lower left portion thereof to instruct storage of scene data to the scene memory. The recall key 15-6b is provided to instruct recall of scene data from the scene memory. The two selection keys are provided in two steps at the center of the scene memory key set 15-6 to select a scene number through up and down operations. An indicator (not shown) for displaying the scene number is provided above or near the scene memory key set 15-6.

Figure 4A:
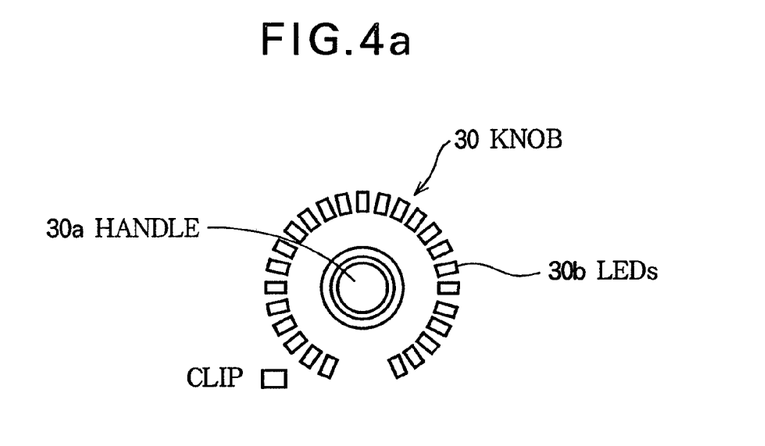
FIGS. 4a and 4b illustrate configurations of knobs and switches provided on the panel of the audio device according to the present invention.

FIG. 4a illustrates a detailed configuration of a knob 30 corresponding to the ATT knob 15-1 or the EQ knob 15-2. The knob 30 includes a round handle 30a, which the user holds and rotates, coupled to a rotary encoder, and a number of LEDs 30b which are each formed in a radial shape and which are arranged surrounding the handle 30a. The knob 30 also includes a clip indicator that is lit when a parameter that is set by the knob 30 has exceeded a threshold. By sequentially lighting the LEDs 30b, it is possible to indicate the magnitude of the parameter that has been set by the knob 30.

Figure 4B:
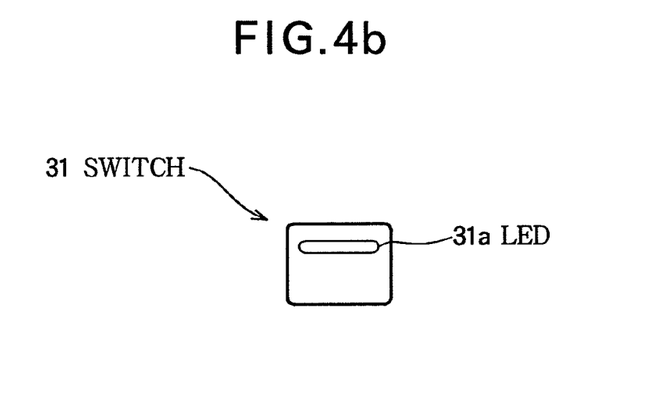

FIG. 4b illustrates a detailed configuration of a switch 31 corresponding to the ON switch 15-3 or the SEL switch 15-4. As shown, the switch 31 includes a rectangular operating unit that reverses the setting state each time it is pressed by the user and an LED 31a is provided on the operating unit. The LED 31a is lit when the switch 31 is on.

Figure 5:
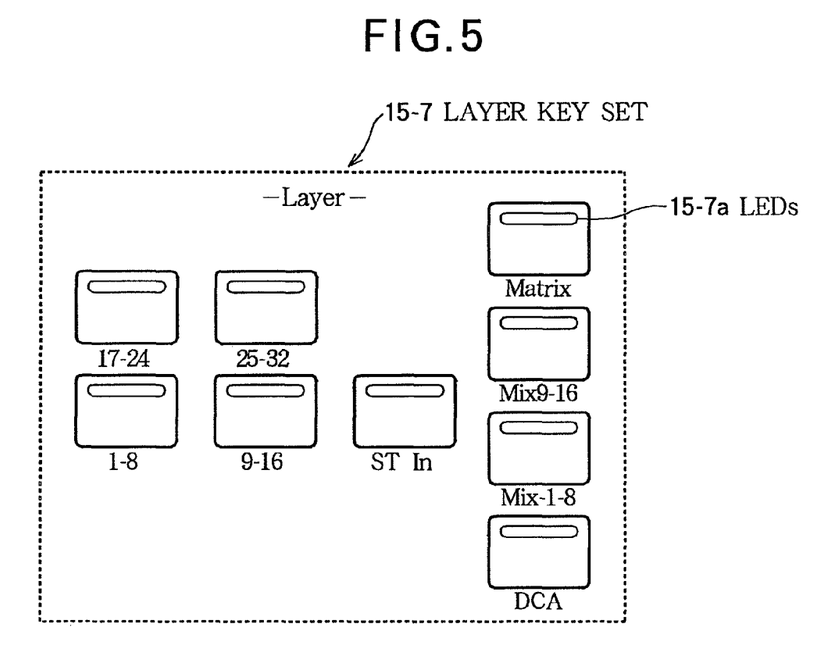
FIG. 5 is an enlarged view of a configuration of a layer key provided on the panel of the audio device according to the present invention.

FIG. 5 is an enlarged view of the layer key set 15-7. In the example of FIG. 5, 32 input channels and 16 mixing buses are provided. The layer key set 15-7 includes a switch for selecting a layer of input channels 1-8 as a layer for operating the input channels through the channel strips, a switch for selecting a layer of input channels 9-16, a switch for selecting a layer of input channels 17-24, and a switch for selecting a layer of input channels 25-32. The layer key set 15-7 also includes a switch for selecting a layer of stereo inputs (ST In), a switch for selecting a layer of a matrix that receives and randomly mixes outputs from 16 mixing buses and outputs the mixed signals, a switch for selecting a layer of mixing buses 1-8, and a switch for selecting mixing buses 9-16. The layer key set 15-7 also includes a switch for selecting a DCA layer for collectively setting parameters of grouped channels. Each of the switches for selecting the layers includes an LED 15-7a that is lit when the switch is selected.

The following is a description of a method for selecting parameters to be stored when storing scene data in the audio device 1 according to the present invention.

When scene data is stored in the scene memory, the audio device 1 enters a selection mode in which parameters to be stored are selected. To enter the selection mode, the user presses the store key 15-6a on the scene memory key set 15-6 for a long time. When the audio device 1 has entered the selection mode, the user operates or moves controls 15 such as knobs, switches, or faders mounted on the panel 2 for selecting parameters to be stored. Parameters that are set by operating the controls 15 are selected as parameters to be stored. When a control 15 is operated, an LED(s) provided on the control (the LEDs 30b when the control is the knob 30 and the LED 31a when the control is the switch 31) is lit or blinks as an indicator to visually indicate that the corresponding parameter has been selected. In the selection mode, a setting function of each control 15 for setting a corresponding parameter is locked (disabled) such that the current setting state such as on/off state, the value, or the like of the parameter is not changed even when the control 15 has been operated for setting the parameter.

However, the functions of the SEL switch 15-4, the scene memory key set 15-6, the layer key set 15-7, or the like which are not used for parameter setting are kept active. Thus, when parameters to be stored are selected, a channel allocated to a channel strip can be selected by operating the SEL switch 15-4 or the scene memory key set 15-6. For example, when each switch on the scene memory key set 15-6 has been operated, channels of a layer corresponding to the operated switch are allocated respectively to the channel strips and parameters to be stored for a channel allocated to each channel strip can be selected by operating controls 15 for setting the parameters to be stored among a knob, switches, and a fader provided on the corresponding channel strip. Each selected parameter can be deselected by again operating the corresponding selected control 15.

As described above, according to the invention, the audio device is composed of a selection mode setting part that sets a selection mode in which a parameter to be stored is selected, a position acquisition part that acquires positions of the controls and locks setting states of the parameters that are set by the controls, when the selection mode is set by the selection mode setting part, a parameter selection part that detects one or more control operated by a user among the controls and selects each parameter corresponding to each operated control among the controls as a parameter to be stored, after the setting states of the parameters are locked by the position acquisition part, and a reset part that returns positions of the controls to the positions acquired by the position acquisition part and memorizes a selection status of each parameter which indicates whether each parameter is selected or not, when the selection mode is completed. The control has an indicator that visually indicates the selection status of the corresponding parameter. The parameter selection part sets the selection status to indicate that the parameter is selected when the corresponding control is once operated in the selection mode, and changes the selection status to indicate that the parameter is non-selected when the corresponding control is again operated in the selection mode.

Controls for setting parameters are also displayed on the display unit 17. By touching an image of a control displayed on the display unit 17 or clicking on the image of the control using a pointing device while a cursor is placed on the image, it is possible to select a parameter that is set by the control as a parameter to be stored. Namely, the audio device includes a display part that displays a display window including images of the controls such that each image of control can be operated by the user on the display window to set a parameter corresponding to each operated image of control. When the setting states of the parameters have been locked by the position acquisition part, the parameter selection part detects one or more image of control operated by the user and selects each parameter corresponding to each operated image of control as a parameter to be stored.

Figure 6:
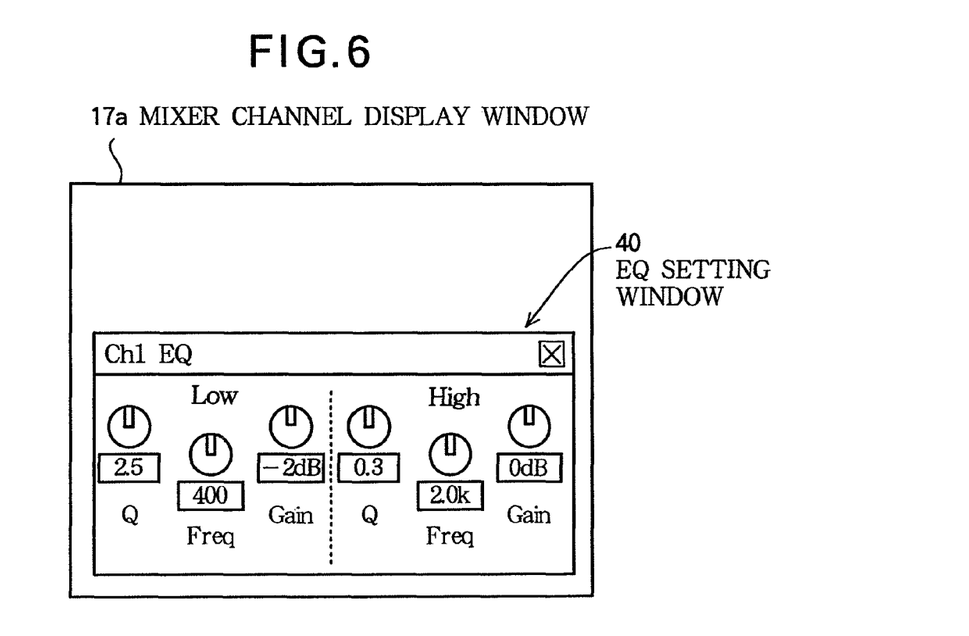
FIG. 6 illustrates an example of a display window displayed on a display unit provided on the panel of the audio device according to the present invention.

To provide a more detailed description, FIG. 6 illustrates an example of a display window displayed on the display unit 17. The display window shown in FIG. 6 is an example of a mixer channel display window 17*a*. An EQ setting window 40 of a first channel is displayed on the mixer channel display window 17*a*. Images of knobs for setting a degree of selection (Q), a frequency, and a gain for each of frequency bands Low and High are displayed on the EQ setting window 40. A parameter that is set using a knob is selected as a parameter to be stored by touching an image of the knob or clicking on the image of the knob while the cursor is placed on the image. In this case, the image of the selected knob is changed or blinks to indicate that it has been selected. A selected parameter can be deselected by touching a corresponding selected control or by clicking on an image of the corresponding selected control.

When the selection of the parameter to be stored is completed in the above manner, the audio device 1 exits the selection mode. To exit the selection mode, for example, the user represses the store key 15-6*a* on the scene memory key set 15-6 for a long time. When the audio device 1 has exit the selection mode, the positions of the controls 15 return to their positions prior to entering the selection mode while selection status of all parameters are stored. The positions of the controls 15 such as knobs or faders return to their positions prior to entering the selection mode in order to reset the original positions even though the controls 15 have been operated since the knobs have been rotated and the handles of the faders have been moved when the parameters to be stored are selected in the selection mode. Then, the setting states of parameters or values of the parameters are stored as scene data in the scene memory according to the selection status of the parameters indicating that the parameters have been selected in the selection mode.

In the audio device 1 of the present invention described above, it is possible to intuitively and efficiently perform operations for selecting or deselecting parameters to be stored. Thus, it is possible to increase the efficiency of operations for selecting parameters when setting selection and non-selection of parameters to be stored. In addition, erroneous selection does not easily occur since the user performs operations for selecting parameters to be stored while viewing the panel 2 or the display unit 17. It is also possible to enable setting of selection/non-selection of fine parameters that have not been provided in the conventional selection list by means of images of controls displayed on the display unit.

Figure 7:
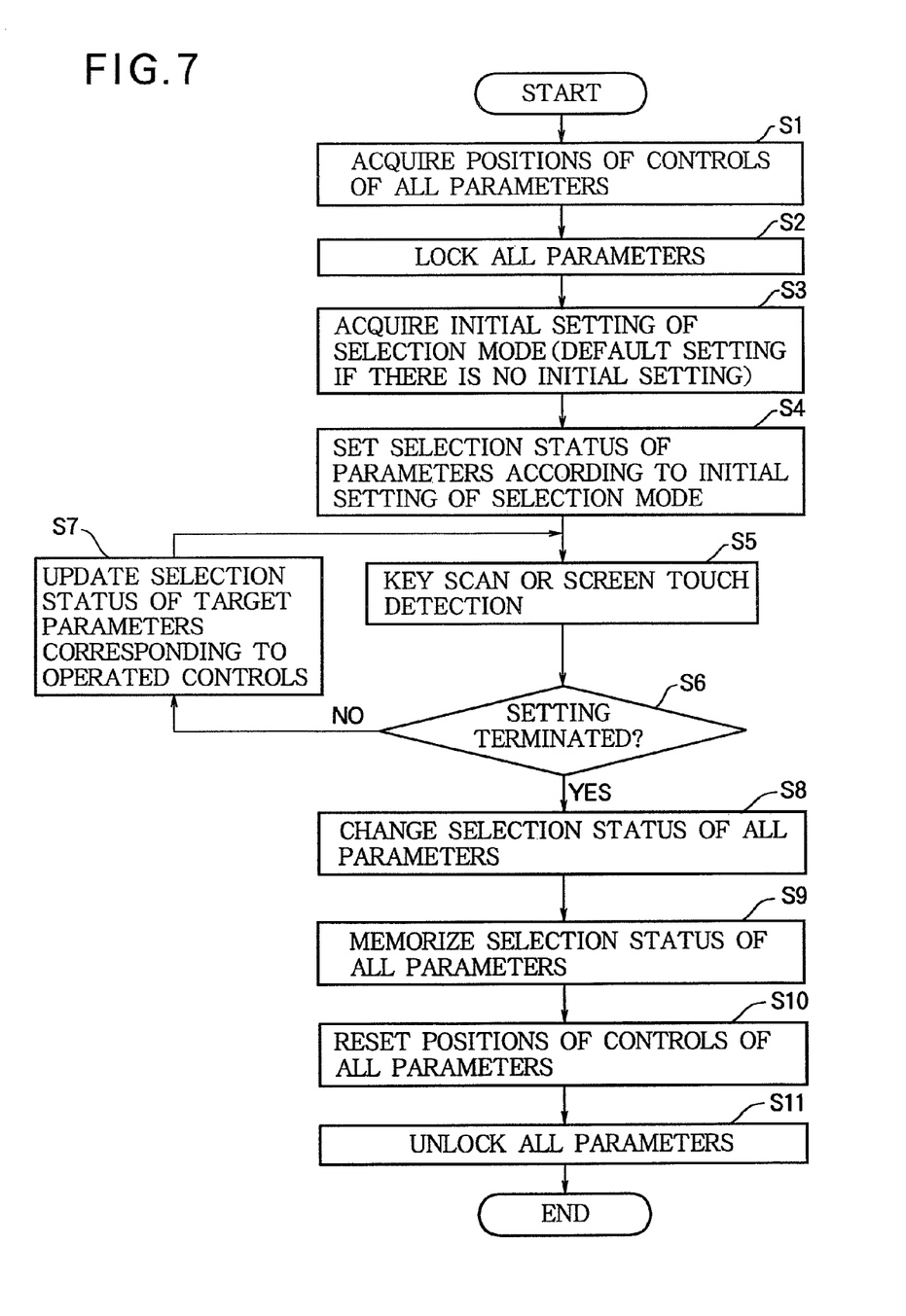
FIG. 7 is a flow chart of a selection mode procedure that is performed by a CPU when the audio device of the present invention has entered the selection mode.

FIG. 7 is a flow chart of a selection mode procedure that is performed by the CPU 10 when the audio device 1 of the present invention has entered the selection mode.

For example, when the audio device 1 enters the selection mode as the user presses the store key 15-6*a* on the scene memory key set 15-6 for a long time, a selection mode procedure starts, and positions of controls 15 for selecting respective parameters of the audio device 1 are acquired at step S1. Then, at step S2, values or states of all parameters are locked so that the parameter setting functions of the controls 15 for parameter setting are locked (disabled). Then, an initial setting of the selection mode is acquired at step S3. The initial setting of the selection mode is selected by the user from predetermined initial settings including: (1) full and complete selection of all parameters; (2) complete deselection of all parameters; (3) selection status of parameters set in a previous selection mode; and (4) selection status of parameters read from a file or the like. When the initial setting of the selection mode is not present, positive selection status indicating "selected" is set to all parameters as a default initial setting (default initial value). Alternatively, negative selection status indicating "non-selected" is set to all parameters as a default initial setting. Selection statuses of parameters are initially set according to the initial setting of the selection mode acquired at step S4.

As described above, the audio device includes an initial setting part that initially sets a selection status of each parameter according to an initial setting, when the selection mode has been set by the selection mode setting part, the initial setting being selectable from a plurality of types of predetermined initial settings. The initial setting part initially sets the selection status of each parameter according to a selected type of the initial setting such that the selection statuses of all the parameters are initially set to indicate that all the parameters are selected. Otherwise, the initial setting part initially sets the selection status of each parameter according to a selected type of the initial setting such that the selection status of all the parameters are initially set to indicate that all the parameters are non-selected. Otherwise, the initial setting part initially sets the selection status of each parameter according to a selected type of the initial setting such that the selection status is set identical to a selection status of each parameter previously set under a previous selection mode. Otherwise, the initial setting part initially sets the selection status of each parameter according to a selected type of the initial setting which is provisionally memorized in the audio device.

Then, in order to change the initial selection status of parameters to desired selection status a control by control basis, key scanning of the controls 15 mounted on the panel 2 or detection of controls that have been operated through screen touching or clicking on images of the controls displayed on the display unit 17 is performed at step S5. Then, it is determined at step S6 whether or not an instruction to terminate the setting has been issued. Here, if it is determined that an instruction to terminate the setting is not yet issued, the procedure branches to step S7. At step S7, the parameters corresponding to the operated controls are each set to an updated selection status and LEDs corresponding to the operated controls are lit or blink or the display colors of images of the operated controls are each brought into a color indicating the updated selection status which indicates either of the selection status or a non-selection status.

Then, the procedure proceeds to step S5. The procedure of steps S5 to S7 is repeated until the selection/deselection of the parameters to be stored is completed. If the user presses, for example, the store key 15-6a for a long time since selection/deselection of parameters to be stored is completed, it is determined at step S6 that an instruction to terminate the setting has been issued and the procedure proceeds to step S8. At step S8, the initial selection statuses of all parameters are changed according to the updated selection statuses set at step S7 and the changed selection statuses of all parameters are memorized in the current memory. Then, at step S10, the positions of the controls of all parameters are reset to the positions acquired at step S1, so that the positions of the controls 15 that have been moved or rotated in the selection mode procedure return to the original positions. Then, at step S11, the locked states of all parameters are released so that the parameter setting functions of the controls 15 for parameter setting are unlocked (enabled) and the selection mode procedure is then terminated.

Figure 8:
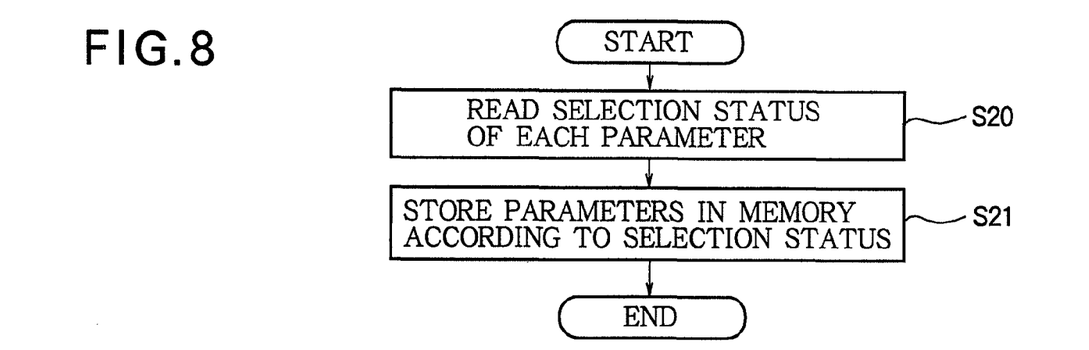
FIG. 8 is a flow chart of a scene data storage procedure that is performed when a store key has been operated in the audio device according to the present invention.

FIG. 8 is a flow chart of a scene data storage procedure that is performed when the store key 15-6a of the scene memory key set 15-6 has been operated. When the store key 15-6a is pressed, a scene data storage procedure starts. At step S20, selection status of all parameters memorized in the selection mode procedure are read from the current memory. Then, at step S21, only setting states or values of parameters that are in selected status are stored as scene data in the scene memory according to the selection status of all parameters read at step S20. Thus, the scene data storage procedure is terminated. As described above, The storing part reads the memorized selection status of all the parameters, and stores a parameter having the selection status indicating that the parameter is selected.

Figure 9:
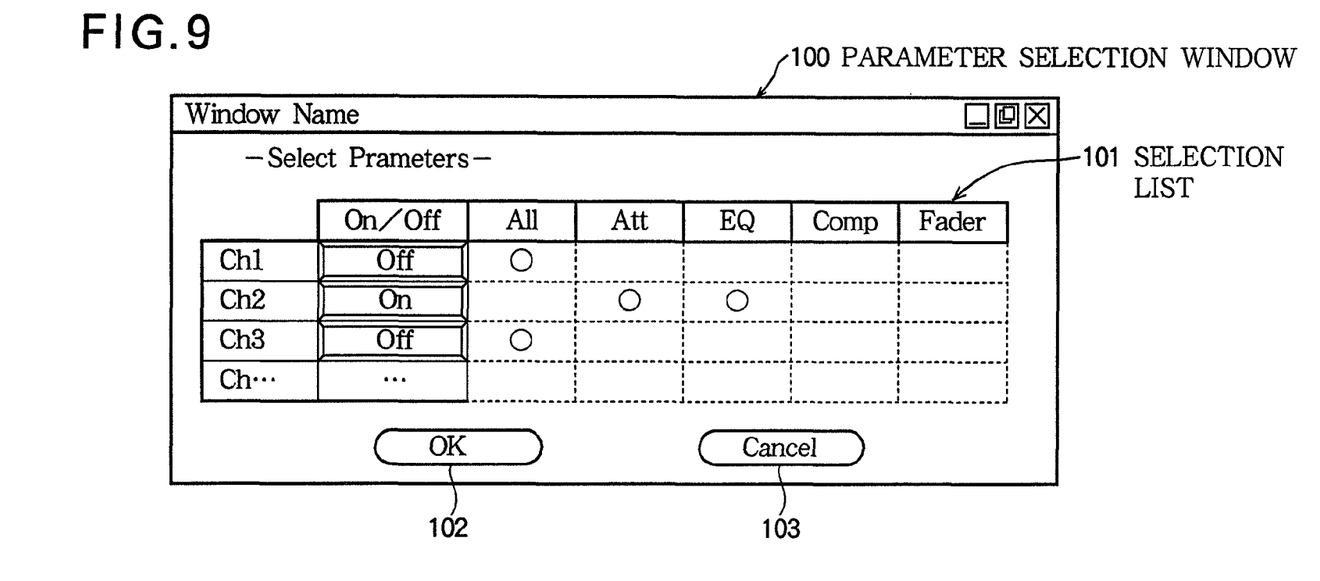
FIG. 9 illustrates an example of a conventional method for selecting parameters to be stored.

FIG. 9 illustrates an example of a conventional method for selecting parameters to be stored. When scene data is stored, the conventional digital mixer allows only specific parameters of the scene data to be selected and stored. When parameters to be stored are selected, a parameter selection window 100 is displayed on a display provided on the panel of a digital mixer as shown in FIG. 9. A selection list 101 for selecting parameters is displayed on the parameter selection window 100. Channel numbers are sequentially arranged in a vertical direction of the selection list 101. Items such as an on/off key, which indicates whether or not to perform selection of respective parameters of items in a corresponding channel, and an All parameter, which indicates that selection of all parameters is performed, an attenuator (Att) parameter, an equalizer (EQ) parameter, a compressor (Comp) parameter, and a fader parameter are arranged in a horizontal direction of the selection list 101. In the illustrated example, in the first channel (Ch1), the on/off key is set to off so that selection of respective parameters of the items is not performed and an All parameter with "o" attached thereto is selected and stored. In the second channel (Ch2), the on/off key is set to on so that selection of respective parameters of the items is performed and an Att parameter and an EQ parameter with "o" attached thereto are selected and stored. In the third channel (Ch3), the on/off key is set to off so that selection of respective parameters of items is not performed and an All parameter with "o" attached thereto is selected and stored. In the case where the user sets whether or not to perform selection of respective parameters of the items to be stored for each channel and selects parameters to be stored individually for the items in the above manner, the user searches for items of desired parameters and performs selection of the respective parameters of the items. The mark "o" is displayed at the location of the item of each selected parameter in the corresponding channel.

The audio device of the present invention described above may be used in combination with the conventional list based parameter selection method. In this case, it is preferable that upper-level parameter types be selected according to the conventional list based method and lower-level fine parameters be selected according to the selection method of the present invention in which controls for setting the lower-level fine parameters are operated. A set (or combination) of parameters for performing selection/deselection of parameters to be stored may be managed for each user or for each project.

Although the audio device 1 described above enters the selection mode as the store key 15-6a of the scene memory key set 15-6 is pressed for a long time, the audio device 1 may also be designed to enter the selection mode as a key other than the store key 15-6a is pressed for a long time.

What is claimed is:

1. An audio device having controls for setting parameters, comprising:
   a selection mode setting part that sets a selection mode in which a parameter to be stored is selected;
   a position acquisition part that acquires positions of the controls and locks setting states of the parameters that are set by the controls, when the selection mode is set by the selection mode setting part;
   a parameter selection part that detects one or more control operated by a user among the controls and selects each parameter corresponding to each operated control among the controls as a parameter to be stored, after the setting states of the parameters are locked by the position acquisition part; and
   a reset part that returns positions of the controls to the positions acquired by the position acquisition part and memorizes a selection status of each parameter which indicates whether each parameter is selected or not, when the selection mode is completed.

2. The audio device according to claim 1, wherein the control has an indicator that visually indicates the selection status of the corresponding parameter.

3. The audio device according to claim 1, wherein the parameter selection part sets the selection status to indicate that the parameter is selected when the corresponding control is once operated in the selection mode, and changes the selection status to indicate that the parameter is non-selected when the corresponding control is again operated in the selection mode.

4. The audio device according to claim 1, further comprising a storing part that reads the memorized selection status of all the parameters, and stores a parameter having the selection status indicating that the parameter is selected.

5. The audio device according to claim 1, further comprising a display part that displays a display window including images of the controls such that each image of control can be operated by the user on the display window to set a parameter corresponding to each operated image of control, wherein, when the setting states of the parameters have been locked by the position acquisition part, the parameter selection part detects one or more image of control operated by the user and selects each parameter corresponding to each operated image of control as a parameter to be stored.

6. The audio device according to claim 1, further comprising an initial setting part that initially sets a selection status of each parameter according to an initial setting, when the selection mode has been set by the selection mode setting part, the initial setting being selectable from a plurality of types of predetermined initial settings.

7. The audio device according to claim 6, wherein the initial setting part initially sets the selection status of each parameter according to a selected type of the initial setting such that the selection statuses of all the parameters are initially set to indicate that all the parameters are selected.

8. The audio device according to claim 6, wherein the initial setting part initially sets the selection status of each parameter according to a selected type of the initial setting such that the selection statuses of all the parameters are initially set to indicate that all the parameters are non-selected.

9. The audio device according to claim 6, wherein the initial setting part initially sets the selection status of each parameter according to a selected type of the initial setting such that the selection status of each parameter is set identical to a selection status of each parameter previously set under a previous selection mode.

10. The audio device according to claim 6, wherein the initial setting part initially sets the selection status of each parameter according to a selected type of the initial setting which is provisionally memorized in the audio device.

11. An audio device comprising a processor, a storage storing a mixing control program and controls for setting parameters, wherein the processor executes the mixing control program to perform steps of:

setting a selection mode in which a parameter to be stored is selected;

acquiring current positions of the controls and locking setting states of the parameters that are set by the controls, when the selection mode is set;

detecting one or more control operated by a user among the controls and selecting each parameter corresponding to each operated control among the controls as a parameter to be stored, after the setting states of the parameters are locked; and returning positions of the controls to the current positions and memorizing a selection status of each parameter indicating whether each parameter is selected or not, when the selection mode is completed.

* * * * *